United States Patent [19]

Zucker

[11] Patent Number: 5,278,713
[45] Date of Patent: Jan. 11, 1994

[54] COOLING DEVICE INCLUDING RIBS, IN COMBINATION WITH A MAGNETIC HEAD

[75] Inventor: Friedhelm Zucker, Mönchweiler, Fed. Rep. of Germany

[73] Assignee: Deutsche Thomson Brandt GmbH, Villingen-Schwenningen, Fed. Rep. of Germany

[21] Appl. No.: 880,938

[22] Filed: Jan. 16, 1992

Related U.S. Application Data

[63] Continuation at PCT/EP90/00988, Jun. 22, 1990.

[30] Foreign Application Priority Data

Jul. 14, 1989 [DE] Fed. Rep. of Germany ....... 3923327

[51] Int. Cl.$^5$ ............................ G11B 5/40; G11B 5/10
[52] U.S. Cl. ....................................... 360/128; 369/13; 360/114; 360/122
[58] Field of Search ................. 360/128, 69, 114, 110, 360/122, 137; 369/13

[56] References Cited

U.S. PATENT DOCUMENTS

| | | | |
|---|---|---|---|
| 4,130,847 | 12/1978 | Head et al. | 360/122 |
| 4,375,656 | 3/1983 | Radman, Jr. et al. | 360/122 X |
| 4,405,961 | 9/1983 | Chow et al. | 360/128 |
| 4,636,898 | 1/1987 | Suzuki et al. | 360/122 |
| 4,949,208 | 8/1990 | Milo et al. | 360/122 |
| 4,956,737 | 9/1990 | Brock | 360/122 |

FOREIGN PATENT DOCUMENTS 63-164004  7/1988  Japan .

Primary Examiner—Stuart S. Levy
Assistant Examiner—Joseph A. Rhoa
Attorney, Agent, or Firm—J. S. Tripoli; E. P. Herrmann; L. L. Hallacher

[57] ABSTRACT

An improved cooling device for cooling the magnetic head (M) of a magneto-optical disc player includes a plurality of arcuate ribs (R) formed as portions of concentric circles and having centers coincident with the axis of rotation of the disc player. The reading/recording head (M) is arranged between the ribs. The rotation of the disc in the proximity of the cooling device creates airflow between the ribs and serves to cool the magnetic head.

4 Claims, 2 Drawing Sheets

COOLING DEVICE INCLUDING RIBS, IN COMBINATION WITH A MAGNETIC HEAD

This is a continuation of application PCT/EP 90/00988 filed Jun. 22, 1990 by Friedhelm Zucker. The invention is directed to a heat dissipator (cooling device) for an element to be cooled, such as magneto-optical disk. The magnetic writing or reading head of a magneto-optical recording and playback device typically becomes sufficiently hot during operation to require efficient cooling.

JP-A 63-164004 teaches that the magnetic core of the read/write magnet in a compact disc player/recorder is coupled to a cooling body. The side to the cooling body which faces the magneto-optical disk is provided with cooling ribs arranged in a direction tangential to the circumference of the disc. The cooling body extends in a radial direction from the edge of the disc to the proximity of the axis of rotation of the disc.

The space available for a cooling body inside a magneto-optical recording and/or playback device is very limited. The invention therefore is directed to a small, but very efficient cooling body for such players/recorders. The invention achieves this goal by the provision of cooling ribs which are arcuate portions of a series of concentric circles. The center of the concentric circles coincides with the axis of rotation of the disk-type rotary recording medium.

Figure 1:
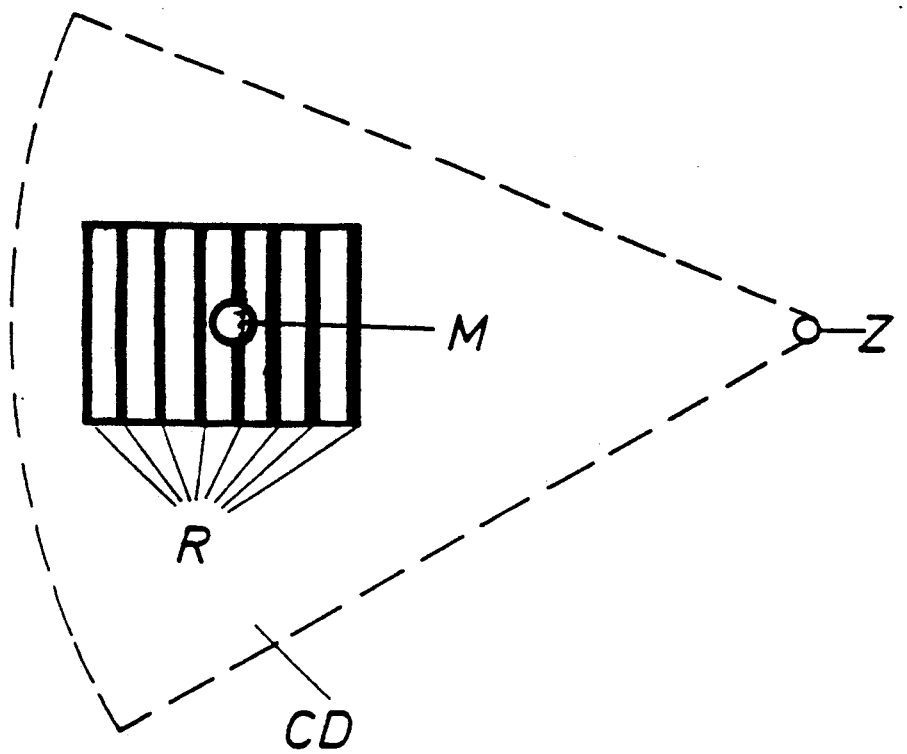
FIG. 1 is a plan view of a first embodiment of the invention.
Figure 2:
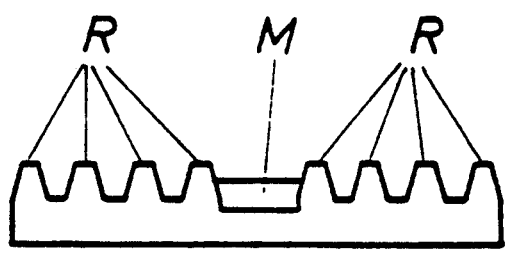
FIG. 2 is a front view of the first embodiment.

In FIG. 1, the reading/writing magnet M is embedded in one side of the cooling body between the cooling ribs R. However, the magnet M can also be located on the other side of the cooling body. The cooling ribs R can be provided on one side or on both sides. As the disc-type recording medium CD, for example, a magneto-optical disk, rotates with respect to, and on either side of, the cooling body in FIG. 1, air is forced between the cooling ribs R. The air flowing between the cooling ribs serves as a very effective coolant of the magnetic head M.

Figure 3:
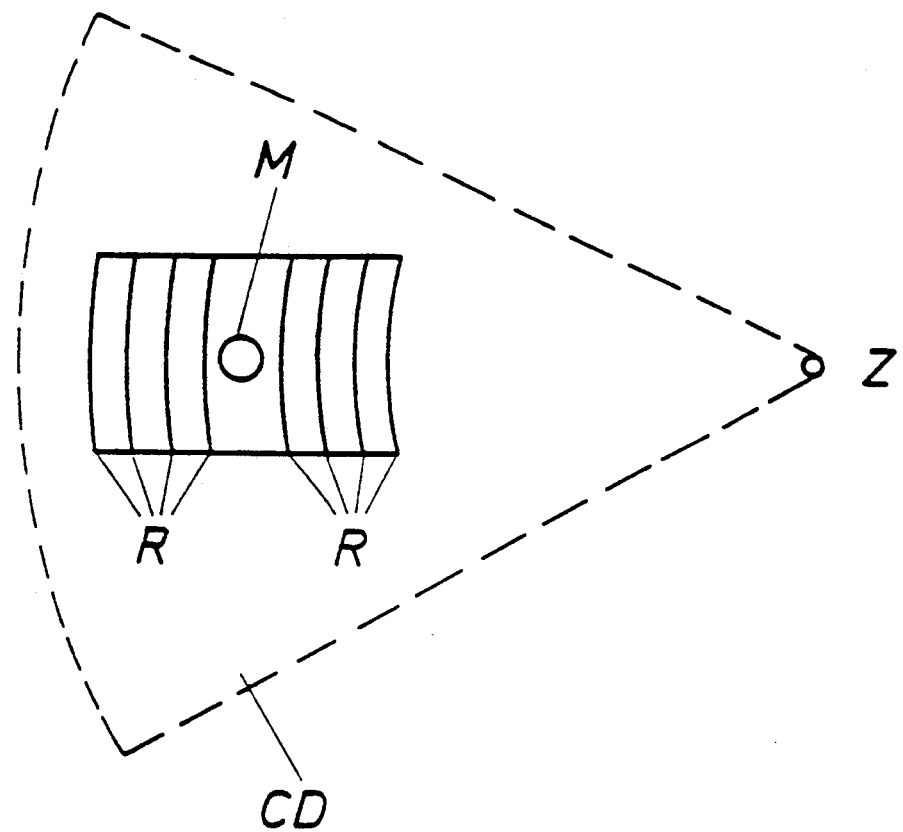
FIG. 3 is a plan view of another preferred embodiment.

In the FIG. 3 embodiment, the cooling ribs R are formed as arcuate portions of concentric circles and are centered on the circumferences of the concentric circles. The centers of the concentric circles coincide with the axes of rotation Z of the disc CD. The air streams generated by the magneto-optical disk CD flow in the spaces between the cooling ribs along a circular path.

A significant advantage of the invention is that the air streams utilized for cooling are generated by the rotation of the disk-type recording medium. An additional fan is, therefore, not necessary. Such a fan would require a relatively large amount of space, which is not available in a magneto-optical recording and playback device.

The invention is, for example, suitable for magneto-optical recording and playback devices equipped with a writing magnet which is located very closely above or below the surface of the magneto-optical disk.

I claim:

1. A magnetic head in combination with a cooling device, for use in a disc player which rotates a disc about a center of rotation, comprising:

the cooling device including cooling means for cooling the magnetic head, wherein the cooling means includes a plurality of arcuate ribs each formed as portions of concentric circles and each circle having a center coincident with the center of rotation of the disc; and wherein the magnetic head is located between the plurality of ribs, wherein the ribs are located on both sides of the magnetic head in a radial fashion.

2. The cooling device of claim 1 wherein said ribs are centered on the circumferences of said concentric circles.

3. The cooling device of claim 2 wherein said cooling device is mounted in close proximity of said disc whereby rotation of said disc creates airflow between said ribs to cool said head.

4. The cooling body of claim 1 wherein said ribs are arranged on both sides of said cooling device.

* * * * *